(12) United States Patent
Hurley

(10) Patent No.: US 7,299,359 B2
(45) Date of Patent: Nov. 20, 2007

(54) APPARATUS AND METHOD FOR INDICATING PASSWORD QUALITY AND VARIETY

(75) Inventor: John C. Hurley, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 818 days.

(21) Appl. No.: 10/421,563

(22) Filed: Apr. 23, 2003

(65) Prior Publication Data

US 2004/0250139 A1    Dec. 9, 2004

(51) Int. Cl.
    *H04L 9/32*        (2006.01)
(52) U.S. Cl. .................. 713/182; 713/183; 713/184
(58) Field of Classification Search ............... 713/182, 713/183, 184
    See application file for complete search history.

(56) References Cited

U.S. PATENT DOCUMENTS

| | | | | |
|---|---|---|---|---|
| 5,461,708 A | * | 10/1995 | Kahn | 345/440 |
| 5,793,952 A | * | 8/1998 | Limsico | 726/18 |
| 5,812,763 A | * | 9/1998 | Teng | 726/25 |
| 6,643,784 B1 | * | 11/2003 | McCulligh | 726/18 |
| 6,971,014 B1 | * | 11/2005 | Hagmeier et al. | 713/182 |
| 7,076,797 B2 | * | 7/2006 | Loveland | 726/4 |

OTHER PUBLICATIONS

Microsoft Corporation, Microsoft PressPass—Passport Password Quality Meter, Oct. 10, 2002.
Mozilla Organization, Personal Security Manager, Feb. 25, 2003.
Openwall Project, John the Ripper Password Cracker, Mar. 12, 2003.
PGP Corporation, PGP 8.0 for Max OS X User's Guide, Chapter 3, Nov. 2002.
Adams et al., Making Passwords Secure and Usable, Proceedings of the HCI'97 Conference on People and Computers, 1997.
Belgers, UNIX Password Security, Dec. 6, 1993.
Bellovin et al., Encrypted Key Exchange: Password-Based Protocols Secure Against Dictionary Attacks, Proceedings of the IEEE Symposium on Research In Security and Privacy, May 1992.
Bishop, Anatomy of a Proactive Password Changer, Proceedings of the 3rd UNIX Security Symposium, Sep. 1992.
Bishop, Proactive Password Checking, Proceedings of the 4th Workshop on Computer Security Incident Handling, Aug. 1992.
Blundo et al., Hyppocrates: A New Proactive Password Checker, Jan. 16, 2003.
Curry, Improving the Security of Your UNIX System, Apr. 1990.
Denning, Passwords, American Scientist, Mar. 1992.

(Continued)

*Primary Examiner*—Kambiz Zand
*Assistant Examiner*—Ellen Tran
(74) *Attorney, Agent, or Firm*—Park, Vaughan & Fleming LLP

(57) ABSTRACT

A method of presenting password information to a user, the method comprising: receiving a password; determining the number of unique character sets utilized in the password; and displaying the number of unique character sets that are contained within the password.

22 Claims, 6 Drawing Sheets

OTHER PUBLICATIONS

Figure 1:
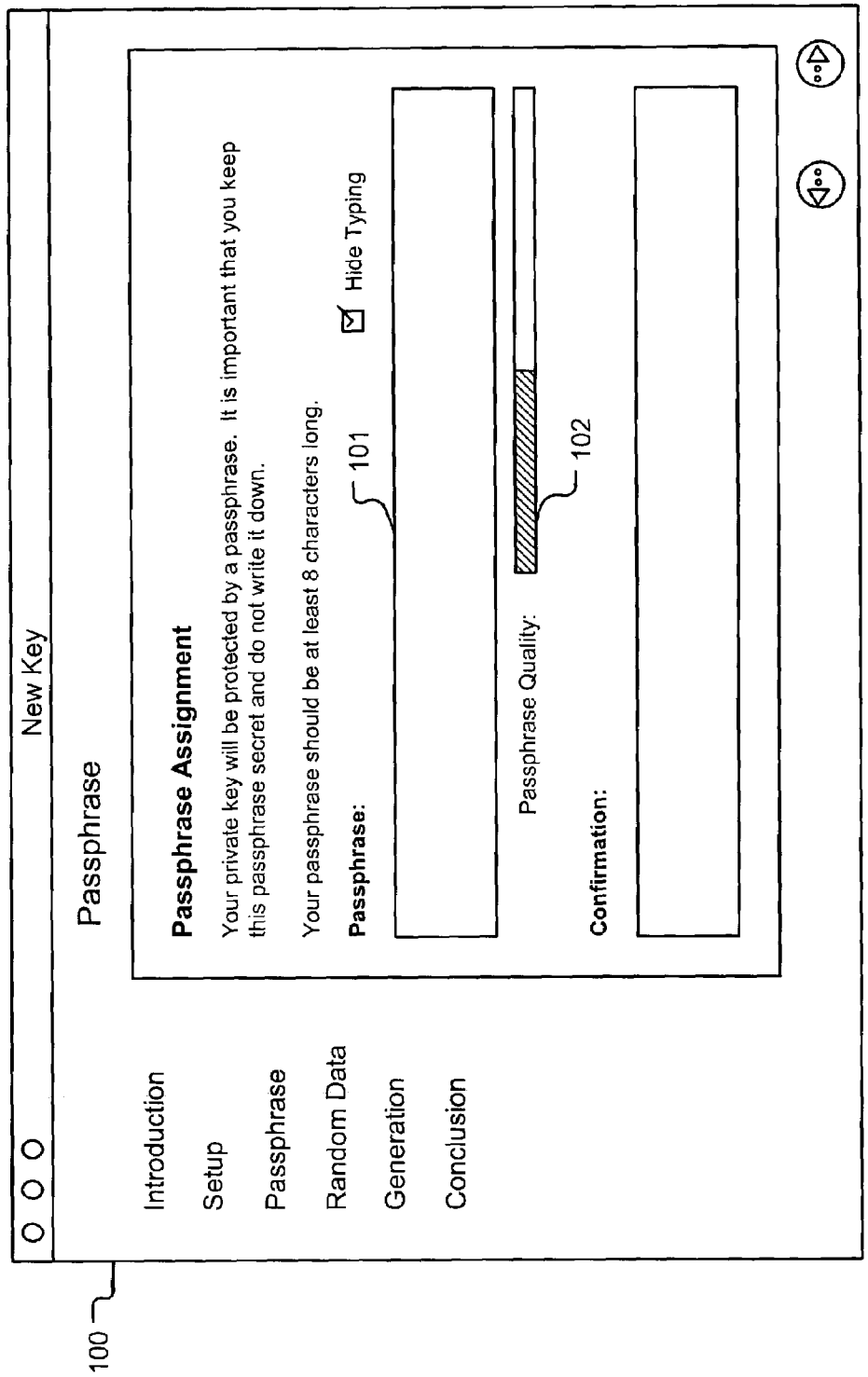

Dhamija et al., Déjà Vu: A User Study Using Images for Authentication, Proceedings of the 9th USENIX Security Symposium, 2000.
Ellison et al., Protecting Secret Keys with Personal Entropy, Oct. 28, 1999.
Feldmeier et al., UNIX Password Security—Ten Years Later, 1989.
Ganesan et al., A New Attack on Random Pronounceable Password Generators, 1994.
Gong et al., Protecting Poorly Chosen Secrets from Guessing Attacks, Jun. 8, 1993.
Klein, "Foiling the Cracker": A Survey of, and Improvements to, Password Security, Proceedings of the 2nd USENIX Workshop on Security, 1990.
Kwon, Authentication and Key Agreement via Memorable Password, 2000.
Lee, A Security-Enhanced Password Management Scheme based on Needham's Scheme.
Lucks, Open Key Exchange: How to Defeat Dictionary Attacks without Encrypting Public Keys, 1997.
National Technical Information Service, FIPS Pub 181—Announcing the Standard for Automated Password Generator, Oct. 5, 1993.
Morris et al., Password Security: A Case History, Communications of the ACM, vol. 22, No. 11, Nov. 1979.
Muffett, A ProActive Password Sanity Library, Dec. 14, 1997.
Provos et al., A Future-Adaptable Password Scheme, Proceedings of the FREENIX Track: 1999 USENIX Annual Technical Conference, Jun. 1999.
Roe et al., Secure Sessions from Weak Secrets, 1998.
Song et al., Practical Techniques for Searches on Encrypted Data, IEEE Symposium on Security and Privacy, 2000.
Spafford, Opus: Preventing Weak Password Choices, Jun. 1991.
Wagner et al., Proofs of Security for the UNIX Password Hashing Algorithm, 2000.
Wu, A Real-World Analysis of Kerberos Password Security, 1999.
Wu, The Secure Remote Password Protocol, Nov. 11, 1997.
Yan et al., The Memorability and Security of Passwords—Some Empirical Results, Technical Report No. 500, Computer Laboratory, University of Cambridge, 2000.
Yan, A Note on Proactive Password Checking, Proceedings of the 2001 Workshop on New Security Paradigms, 2001.
Lee, A Security-Enhanced Password Management Scheme based on Needham's Scheme, date unknown.

* cited by examiner

APPARATUS AND METHOD FOR INDICATING PASSWORD QUALITY AND VARIETY

1. FIELD OF THE INVENTION

The present invention generally relates to apparatuses and methods for indicating the quality and variety of a password used for computer system authentication.

2. BACKGROUND

Several techniques for protecting the data in computer systems have been utilized. The most common technique is to prevent unauthorized user access by providing authentication and access control through the use of a password. A password typically consists of a sequence of letters, numbers, and/or special characters. Passwords are often used to verify the identity of a user before granting access to computer systems, web pages, e-mail, files, or software programs.

Unfortunately, users frequently choose words that are familiar to them as their password. Thus, these easily detected passwords can compromise the security of a computer system. High speed communications, increased network capabilities and high performance processors can enable a "cracker" program, a computer program used for breaking security on a computer system, to quickly determine a user's password. As a result, software programs that incorporate proactive password checkers, such as Microsoft's Passport, Mozilla's Personal Security Manager, John the Ripper and Pretty Good Privacy (PGP), have been developed to predetermine whether a user's proposed password will be vulnerable to cracking. Some of the methods used by proactive password checkers to determine a password's susceptibility to cracking include verifying if the password exists in a dictionary, checking the length of the password, and comparing the password to a permutation of the letters in the user's name.

As is well known, PGP uses public-key cryptography to encrypt and decrypt e-mails and files in order to prevent unauthorized access. Public-key cryptography uses two keys, a private key and a public key, for encrypting and decrypting data. When creating a private key, a password specified by the user is assigned to protect the key. An example of a "New Key" screen is shown in FIG. 1. The user can enter a password for the private key in the field 101. As each character is entered, the "Passphrase Quality" meter 102 proactively indicates to the user the level of quality of the password. However, PGP does not indicate to the user why the quality of their proposed password is high or low. In addition, PGP does not indicate to the user how to improve the quality of their proposed password without increasing the length of the password.

Examples such as these show that a need exists for an apparatus and a method to indicate to the user how to improve the quality a password.

3. SUMMARY OF THE INVENTION

One embodiment of the invention is a method of presenting password information to a user, the method includes: receiving a password; determining the number of unique character sets utilized in the password; and displaying the number of unique character sets that are contained within the password. In some embodiments of the invention, the number of unique character sets is displayed as the user enters his password. In other embodiments of the invention, the number of unique character sets is displayed after the user has completely entered his password.

Another embodiment of the invention is a method of presenting password information to a user, the method includes: receiving a password; identifying each unique character set utilized in the password; determining the total number of characters included in the identified character sets; and displaying the total number of characters to a user. In some embodiments of the invention, the total number of characters is displayed as the user enters his password. In other embodiments of the invention, the total number of characters is displayed after the user has completely entered his password.

Another embodiment of the invention is a program storage device containing instructions that when executed by a computer perform the following acts: receiving a password; determining the number of unique character sets utilized in the password; and displaying the number of unique character sets that are contained within the password.

Yet another embodiment of the invention is a program storage device containing instructions that when executed by a computer perform the following acts: receiving a password; identifying each unique character set utilized in the password; determining the total number of characters included in the identified character sets; and displaying the total number of characters to a user.

4. BRIEF DESCRIPTION OF THE FIGURES

Figure 2:
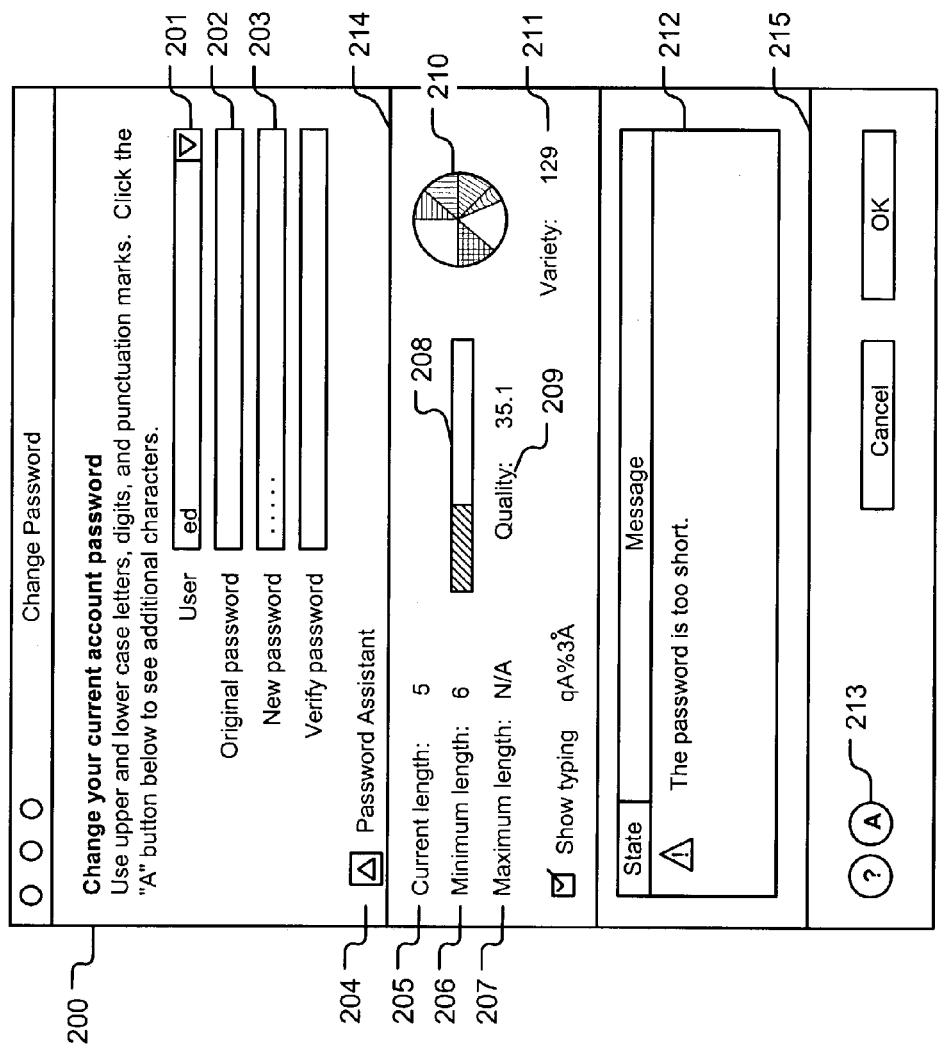
Figure 3:
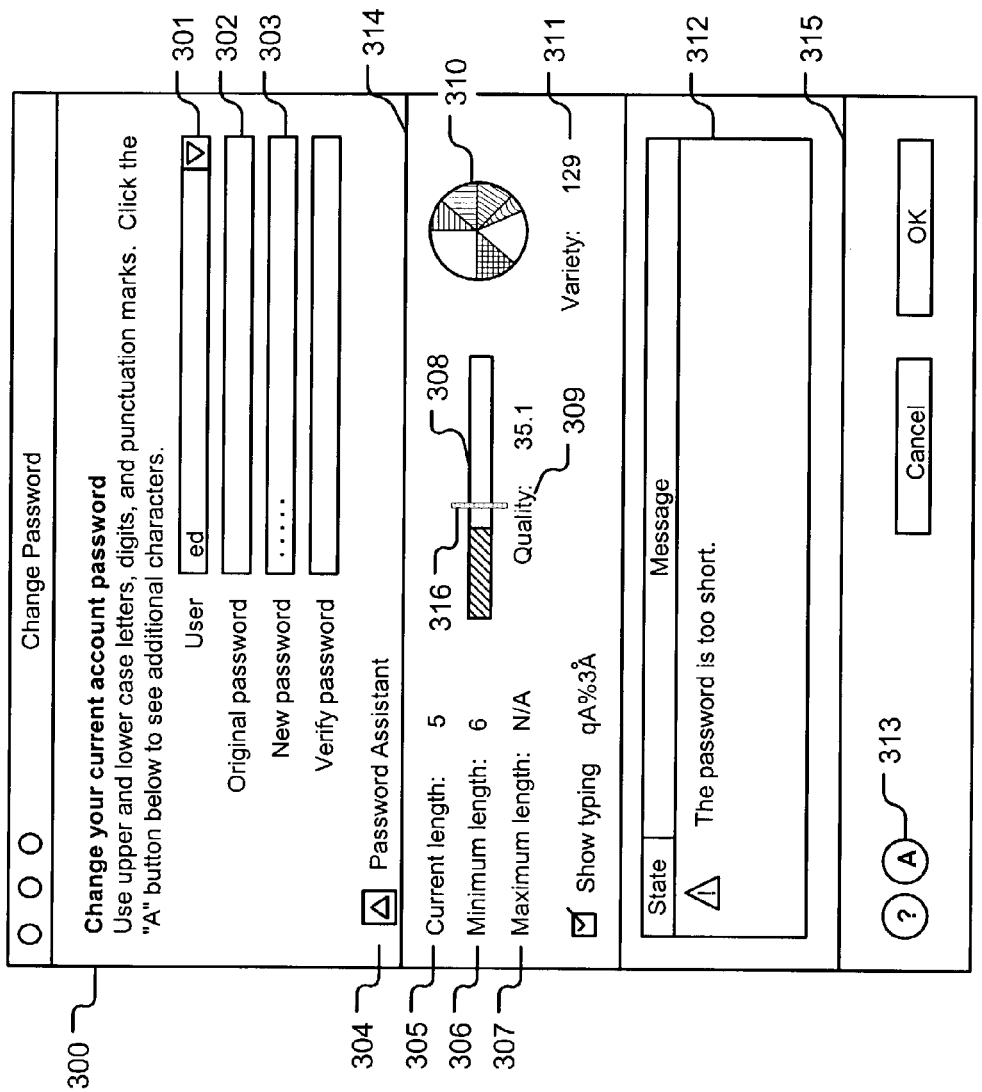
Figure 4:
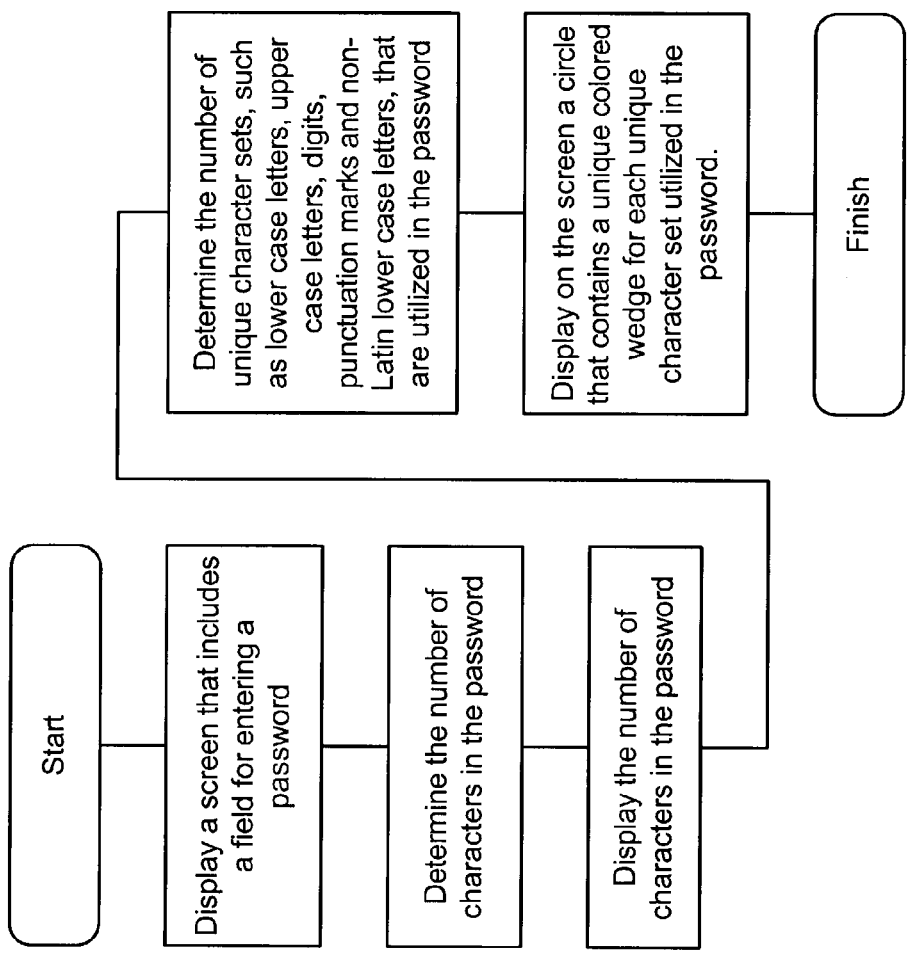
Figure 5:
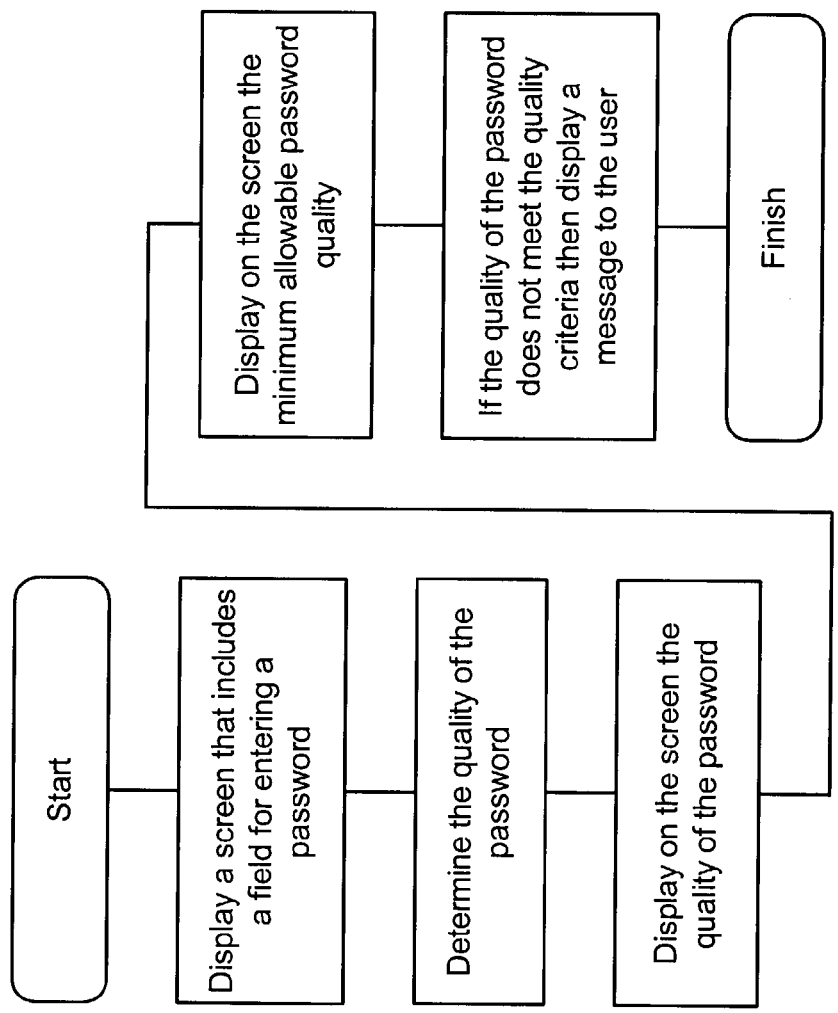
Figure 6:
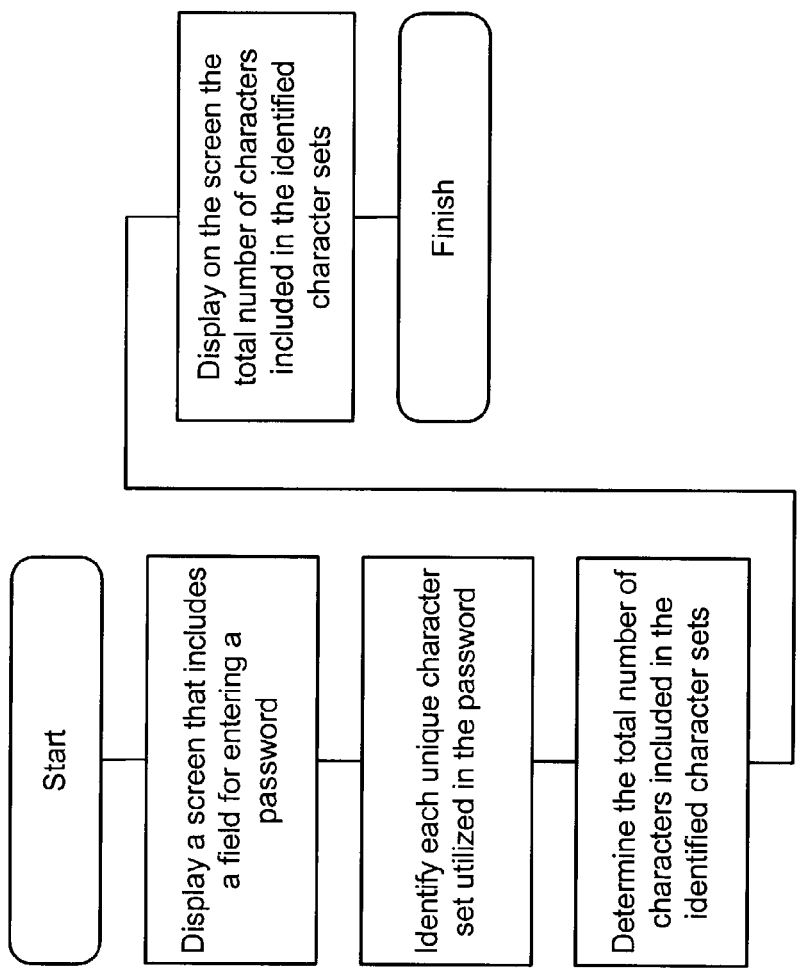

FIG. 1 presents a (prior art) New Key screen.
FIG. 2 presents a Change Password screen.
FIG. 3 presents another Change Password screen.
FIG. 4 presents a flow chart of one embodiment of the invention
FIG. 5 presents a flow chart of another embodiment of the invention.
FIG. 6 presents a flow chart of still another embodiment of the invention.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One embodiment of the invention is a computer program that allows a user to enter a password and then presents information to the user as each character is specified for the password. As discussed in detail below, the computer program can indicate to the user how to improve the quality of the entered password.

5.1 Displaying the Change Password Screen

In one embodiment of the invention, a computer program could display a "Change Password" screen 200 such as shown in FIG. 2. The Change Password screen 200 could allow the user to add or change a password that grants access to a computer system, web page, e-mail, file, software program, or any other computer resource.

The Change Password screen 200 may contain a field 201 for entering or selecting a user, a field 202 for entering the user's original password and a field 203 for entering the user's new password. In some embodiments of the invention, the Change Password screen 200 may include a field to verify the user's new password or may include a field to create the user's original password.

The Change Password screen 200 may include a Password Assistant icon 204. If the user selects the Password Assistant icon 204, then the computer program could display on the Change Password screen 200 information to the user regarding how to improve the quality and/or variety of the password specified. In some embodiments of the invention, if the user selects the Password Assistant icon 204, the computer program could either hide or display the information located between line 214 and line 215. In other embodiments of the invention, if the user selects the Password Assistant icon 204, then the computer program could display a separate screen or computer program providing information to the user regarding how to improve the quality and/or variety of the password specified.

5.2 Displaying Password Assistant Information

In some embodiments of the invention, the computer program could display information to the user regarding the length of the new password. As the user enters the new password in field 203, the computer program could update the current length text field 205 to indicate the length of the new password. In addition, the computer program could display the minimum length required for a password in the minimum length text field 206. In addition, the computer program could display the maximum length allowed for a password in the maximum length text field 207. The minimum and maximum lengths could be specified by the computer program, by external parameters available to the computer program or by other methods known in the art.

In some embodiments of the invention, the computer program could display information to the user regarding how to improve the quality of the password. The computer program could display a Quality meter 208. As each character for the new password is entered in field 203, the Quality meter 208 could indicate to the user the quality of the password. As the quality of the password increases, the progress bar on the Quality meter 208 could correspondingly increase in length. In addition, the computer program could display the quality of the password in the Quality text field 209.

Several methods can be utilized to calculate the quality of the password. In some embodiments of the invention, the quality of the password is determined by the length of the password and the size of the character set used to form the password. The quality of the password could be calculated as follows:

$$\text{Quality of password} = 5 * \log_{10} (\text{number of passwords (length of password)})$$

where the number of passwords for length N and character set size sz is calculated as:

$$\text{number of passwords } (N) = (sz^N + sz^{(N-1)} + \ldots + sz).$$

Using this formula, the quality calculated for a four character password composed of characters from the full printable 8 bit character set (223 characters) is roughly equivalent to the quality calculated for a seven character password composed of only lower case letters. Thus, a significant improvement in password quality can be obtained by increasing the size of the character set from which the password characters are chosen.

In some embodiments of the invention, the computer program could display information to the user regarding how to improve the variety of the password. The computer program could indicate to the user the number of unique character sets that is contained within the password. A password can consist of a sequence of letters, numbers, and special characters. Character sets for a password can consist of lower case letters [a . . . z], upper case letters [A . . . Z], digits [0 . . . 9], punctuation marks [! . . . ~] or other 8 bit printable characters. In some embodiments of the invention, the computer program could display a Variety circle 210 that contains a wedge for each unique character set utilized within the password. Each wedge in the Variety circle 210 could be displayed with a distinct fill pattern using color, grids, graphical images, or a combination of these fill patterns. In some embodiments of the invention, the size of the wedge could indicate the total number of unique characters in the character set. In such embodiments, the computer program could calculate the total number of characters available when specifying a password. Then, the computer program could display a Variety circle 210 containing a wedge for each unique character set sized in proportion to the total number of characters available.

In some embodiments of the invention, the computer program could display a Variety text field 211 that indicates the total number of characters included in the character sets contained within the password. For example, a password containing at least one lower case letter [a . . . z] out of 26 possible values, at least one upper case letter [A . . . Z] out of 26 possible values, at least one punctuation mark [! . . . ~] out of 33 possible values, at least one digit [0 . . . 9] out of 10 possible values and at least one non-Latin upper case letter out of 34 possible values could display a value of "129" (26+26+33+10+34) in the Variety text field 211. Other character sets could include non-Latin lower case letters and symbols.

In some embodiments of the invention, the computer program could display information to the user regarding why a password does not meet specific quality criteria. The quality criteria could be specified by the computer program, by external parameters available to the computer program or by other methods known in the art. For example, the computer program could display the information in a Message text field 212. Thus, if the password entered in field 203 is shorter in length than the minimum length criteria, then a message could be displayed to the user indicating such. Similarly, if the quality of the password entered in field 203 is lower than the minimum quality criteria, then another message could be displayed to the user indicating such. In addition, if the variety of the password entered in field 203 is lower than the minimum variety criteria, then another message could be displayed to the user indicating such. In other embodiments of the invention, the computer program could utilize other password strength checkers, such as cracklib, to determine the quality of the password and then display the resulting messages from the password strength checker in a Message text field 212.

In some embodiments of the invention, the computer program could validate whether the password exists or is similar to a word located in a dictionary. If the password entered in field 203 is a dictionary word or similar to a dictionary word, then a message could be displayed in the Message text field 212 indicating such. In other embodiments of the invention, the computer program could validate whether the password is a permutation of the letters in the user's name. If the password entered in field 203 is a permutation of the letters in the user's name, then a message could be displayed in the Message text field 212 indicating such.

In still other embodiments of the invention, the computer program could include a Character Set icon 213. If the user selects the Character Set icon 213, then the computer program could display character sets that can be used to improve the quality of a password. For example, character sets that are utilized in a password could be displayed in one color while unused character sets could be displayed in another color. Alternatively, only unused character sets could be displayed.

In still other embodiments of the invention, the computer program could display a "Change Password" screen 300 such as shown in FIG. 3. The Change Password screen 300 is similar to the Change Password screen 200 except that the Change Password screen 300 includes information for the user regarding the minimum allowed quality for a password. The computer program could display a Quality meter 308 and a Minimum Allowed Quality Mark 316. As each character for the new password is entered in field 303, the Quality meter 308 could indicate to the user the quality of the password. As the quality of the password increases, the progress bar on the Quality meter 308 could correspondingly increase in length and indicate whether it is below, equal or above the Minimum Allowed Quality Mark 316 for a password. The minimum allowed quality could be specified by the computer program, by external parameters available to the computer program or by other methods known in the art.

5.3 CONCLUSION

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, one embodiment of the invention is shown in FIG. 4. Another embodiment of the invention is shown in FIG. 5. Still another embodiment of the invention is shown in FIG. 6. Other embodiments of the invention would include program storage devices containing instructions that when executed by a computer, perform all or portions of the methods discussed above. Examples of such program storage devices include random access memory, read only memory, hard disk drives, CDs, DVDs, floppy disks, and similar devices. Additionally, the above disclosure is not intended to limit the present invention. The scope of the present invention is defined by the appended claims.

It is claimed:

1. A method for displaying password information to a user by a computer system, the method comprising:
   receiving one or more characters of a password;
   dynamically determining information about the susceptibility of the password characters to being cracked as the characters are being received, wherein the information involves a quality of the received password characters, wherein the quality is a numerical measure of the susceptibility of the received password characters to being cracked; and
   displaying the information to the user to inform the user about the susceptibility of the password to being cracked, and to enable the user to dynamically improve the quality of the password characters being received.

2. The method of claim 1, wherein determining the quality of the received password characters includes determining a minimum allowable password quality, wherein the minimum allowable password quality is determined from the methods used to evaluate a password's susceptibility to cracking.

3. The method of claim 1 further comprising:
   determining if the received password characters meet a quality criteria, wherein the quality criteria are determined from the methods used to evaluate a password's susceptibility to cracking; and if the received password characters do not meet the quality criteria, then displaying a message to the user.

4. The method of claim 1, further comprising:
   displaying the number of characters in the received password characters.

5. The method of claim 1, wherein the information about the password characters includes determining the number of unique character-sets utilized in the received password characters.

6. The method of claim 5, wherein determining the number of unique character sets includes determining if a character set that includes [a . . . z] is utilized in the received password characters.

7. The method of claim 5, wherein determining the number of unique character sets includes determining if a character set that includes [A . . . Z] is utilized in the received password characters.

8. The method of claim 5, wherein determining the number of unique character sets includes determining if a character set that includes [0 . . . 9] is utilized in the received password characters.

9. The method of claim 5, wherein determining the number of unique character sets includes determining if a character set that includes [! . . . ~] is utilized in the received password characters.

10. The method of claim 5, wherein determining the number of unique character sets includes determining if a character set that includes non-Latin lower case characters is utilized in the received password characters.

11. The method of claim 5, further comprising:
    identifying each unique character set utilized in the received password characters;
    determining the total number of characters included in the identified character sets; and
    displaying the total number of characters included in the identified character sets to a user.

12. The method of claim 1, wherein displaying the information about the password characters includes displaying the number of unique character sets contained in the received password characters.

13. The method of claim 12, wherein displaying the number of unique character sets includes displaying a circle that contains a wedge for each unique character set utilized within the received password characters.

14. The method of claim 12, wherein displaying the number of unique character sets includes displaying a circle that contains a wedge for each unique character set utilized within the received password characters and the size of at least one wedge indicates the number of characters in a character set.

15. A method for displaying password information to a user by a computer system, the method comprising:
- receiving one or more characters of a password;
- dynamically identifying each unique character set utilized in the password, as the password characters are being received;
- dynamically determining the total number of characters included in the identified character sets, as the password characters are being received;
- dynamically determining a quality of the received password characters, wherein the quality is a numerical measure of the susceptibility of the received password characters to being cracked;
- displaying the total number of characters included in the identified character sets to a user; and
- displaying the determined quality to enable the user to dynamically improve the quality of the password characters being received.

16. The method of claim 15, wherein determining the quality of the received password characters includes determining a minimum acceptable password quality, wherein the minimum allowable password quality is determined from the methods used to evaluate a password's susceptibility to cracking.

17. The method of claim 15, further comprising, displaying the number of characters in the received password characters.

18. A program storage device containing instructions that when executed by a computer perform the following acts:
- receiving one or more characters of a password;
- dynamically determining information about the susceptibility of the password characters to being cracked, as the password characters are being received, wherein the information involves a quality of the received password characters, wherein the quality is a numerical measure of the susceptibility of the received password to being cracked; and
- dynamically displaying the information to the user to inform the user about the susceptibility of the password to being cracked, and to enable the user to dynamically improve the quality of the password characters being received.

19. The program storage device of claim 18, wherein the information about the password characters includes determining the number of unique character-sets utilized in the received password characters.

20. The program storage device of claim 18, wherein displaying the information about the password characters includes displaying the number of unique character sets contained in the received password characters.

21. A program storage device containing instructions that when executed by a computer perform the following acts:
- receiving one or more characters of a password;
- dynamically identifying each unique character set utilized in the password, as the password characters are being received;
- dynamically determining the total number of characters included in the identified character sets, as the password characters are being received;
- dynamically determining a quality of the received password characters, wherein the quality is a numerical measure of the susceptibility of the received password characters to being cracked;
- displaying the total number of characters included in the identified character sets to a user; and
- displaying the determined quality to enable the user to dynamically improve the quality of the password characters being received.

22. The method of claim 21, further comprising:
- determining the number of unique character sets utilized in the received password characters; and
- displaying the number of unique character sets that are contained within the received password characters.

* * * * *